United States Patent

Kelley et al.

[11] Patent Number: 6,014,692
[45] Date of Patent: Jan. 11, 2000

[54] WEB BROWSER FILE SYSTEM ATTACHMENT

[75] Inventors: Edward E. Kelley, Wappingers Falls; Norman J. Dauerer, Hopewell Junction, both of N.Y.

[73] Assignee: International Business Machines Corporation, Armonk, N.Y.

[21] Appl. No.: 08/978,015

[22] Filed: Nov. 25, 1997

[51] Int. Cl.[7] .................................................. G06F 15/16
[52] U.S. Cl. .......................... 709/217; 709/218; 709/219; 707/2
[58] Field of Search ................................. 709/217, 219, 709/218, 227, 228; 707/1, 2, 3, 4, 5, 6, 7, 8, 9, 10, 100, 101, 102, 103, 104

[56] References Cited

U.S. PATENT DOCUMENTS

| | | | |
|---|---|---|---|
| 5,559,984 | 9/1996 | Nakano et al. | 707/2 |
| 5,781,743 | 7/1998 | Matsuno et al. | 709/228 |
| 5,898,835 | 4/1999 | Truong | 709/217 |
| 5,902,353 | 5/1999 | Reber et al. | 709/217 |

*Primary Examiner*—Dung C. Dinh
*Assistant Examiner*—Chuong Ho
*Attorney, Agent, or Firm*—DeLio & Peterson, LLC; Peter W. Peterson; Aziz M. Ahsan

[57] ABSTRACT

A new uniform resource locator (URL) of file system attachment (FSA) is created on a web browser. The new URL combines features of the URLs of HTTP and "file". The new URL first attempts to attach the file system where the data is stored. If the client has access to the data base or the data storage where the requested information is stored, then the web server may be bypassed by using the URL of "file" and use of the server is not required. If the client does not receive access to the data base or the data storage where the requested information is stored, then the URL of FSA will act like the standard URL of HTTP and access data through the server.

19 Claims, 3 Drawing Sheets

WEB BROWSER FILE SYSTEM ATTACHMENT

BACKGROUND OF THE INVENTION

1. Field of the Invention

The present invention relates to computer programming and, in particular, to computer software for directly accessing information from a file system with a web browser on the Internet or on an intranet, without accessing the web server.

2. Description of Related Art

Current web browsers processing a URL (Uniform Resource Locator) of HTTP (HyperText Transport Protocol) are all processed by a web server that retrieves the data and sends it back to the requesting web browser on the client. As shown in FIG. 1, when a URL is selected, web client computer 100 sends a request to web server computer 101 to get the web page from data base 103 (on a separate computer) and the web server transmits the web page back to the web client for display on computer screen 102. If the web server is not operating or network 104 is busy, then the web browser on the client system cannot access data that is controlled by the web server. If the web server is operating and the network is functioning, a delay in processing can be caused by having an abundance of requests for data made through the network to the web server.

Only if the client system has access to the data base or the data storage where the requested information is stored may the file be accessed directly. Currently, there is no way of determining whether the web client has access to the storage area, so the overwhelming majority of URL's are listed as HTTP.

Bearing in mind the problems and deficiencies of the prior art, it is therefore an object of the present invention to provide a method for directly accessing information on a file system accessible by a web server without accessing the web server.

It is another object of the present invention to provide a program storage device which embodies an executable program which permits direct access to information on a file system accessible by a web server without accessing the web server.

A further object of the invention is to provide with the aforementioned method a way of determining whether the user has authority to access directly the desired file system.

It is yet another object of the present invention to provide a method of accessing the desired file system if direct access is unsuccessful.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for accessing information on a computer with an inter- or intra-net web browser from a file system accessible by a web server. First, there is provided, on a client computer system, access to a program for making available the desired file system. There is also provided in a URL (Uniform Resource Locator) a file system attachment comprising a name of the desired file system, location of the desired file system, and identification of the program for making available the desired file system. The method then comprises attaching the desired file system by directly contacting a data base containing the desired file system, utilizing the program and the name and location of the desired file system, without accessing the web server. The steps of providing access to a program for making available the desired file system and attaching the desired file system are processed on the client computer system separate from the web server.

Additionally, there may be provided in the file system access a user identification, and utilizing the user identification to access the desired file system. Also, in the step of attaching the desired file system, there may be further included the step of determining if the client computer system has previously requested attachment to the desired file system.

In another aspect, the present invention provides a process for accessing information on a computer with an inter- or intra-net web browser from a file system accessible by a web server comprising the steps of:

a) providing, on a client computer system, access to a program for making available the desired file system;

b) providing in a URL a file system attachment comprising a name of the desired file system, location of the desired file system, and identification of the program for making available the desired file system;

c) determining if the client computer system is attached to the desired system;

d) if the client computer system is not attached to the desired system, attempting to attach the desired file system by directly contacting a data base containing the desired file system without accessing the web server;

e) if the attempt to attach the desired file system in step (d) is successful, utilizing the program and the name and location of the desired file system to obtain information from the desired file system without accessing the web server; and f) if the attempt to attach the desired file system in step (d) is unsuccessful, obtaining information from the desired file system by utilizing the URL to send a transaction to the web server, attaching the desired file system with the web server; and returning the information to the client computer system with the web server.

In a further aspect, the present invention provides a process for accessing information on a computer with an inter- or intra-net web browser from a file system accessible by a web server comprising the steps of:

a) providing, on a client computer system, access to a program for making available the desired file system;

b) providing in a URL a file system attachment comprising a name of the desired file system, location of the desired file system, and identification of the program for making available the desired file system;

c) attempting to attach the desired file system by directly contacting a data base containing the desired file system without accessing the web server;

d) if the attempt to attach the desired file system in step (c) is successful, utilizing the program and the name and location of the desired file system to obtain information from the desired file system without accessing the web server; and e) if the attempt to attach the desired file system in step (c) is unsuccessful, obtaining information from the desired file system by utilizing the URL to send a transaction to the web server, attaching the desired file system with the web server; and returning the information to the client computer system with the web server.

The process of may further include, prior to step (c), the step of determining if the client computer system is attached to the desired system, and if the client computer system is not attached to the desired system, attempting to attach the desired file system as in step (c). In step (b), the URL may be provided in a web page accessed by the client computer system through a web server.

In yet another aspect, the present invention relates to a program storage device readable by a machine, tangibly embodying a program of instructions executable by the machine to perform the aforementioned methods of accessing information on a computer with an inter- or intra-net web browser from a file system accessible by a web server.

In a further aspect, the present invention provides a system for providing access to information on a computer with an inter- or intra-net web browser from a file system accessible by a web server. The system comprises a program on a client computer for making available the desired file system, and a file system attachment in a URL comprising a name of the desired file system, location of the desired file system, and identification of the program for making available the desired file system. A data base containing the desired file system may be directly contacted utilizing the program and the name and location of the desired file system to attach the desired file system, without accessing the web server. If the attempt to attach the desired file system is unsuccessful, information from the desired file system may be obtained by attaching the desired file system with the web server.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
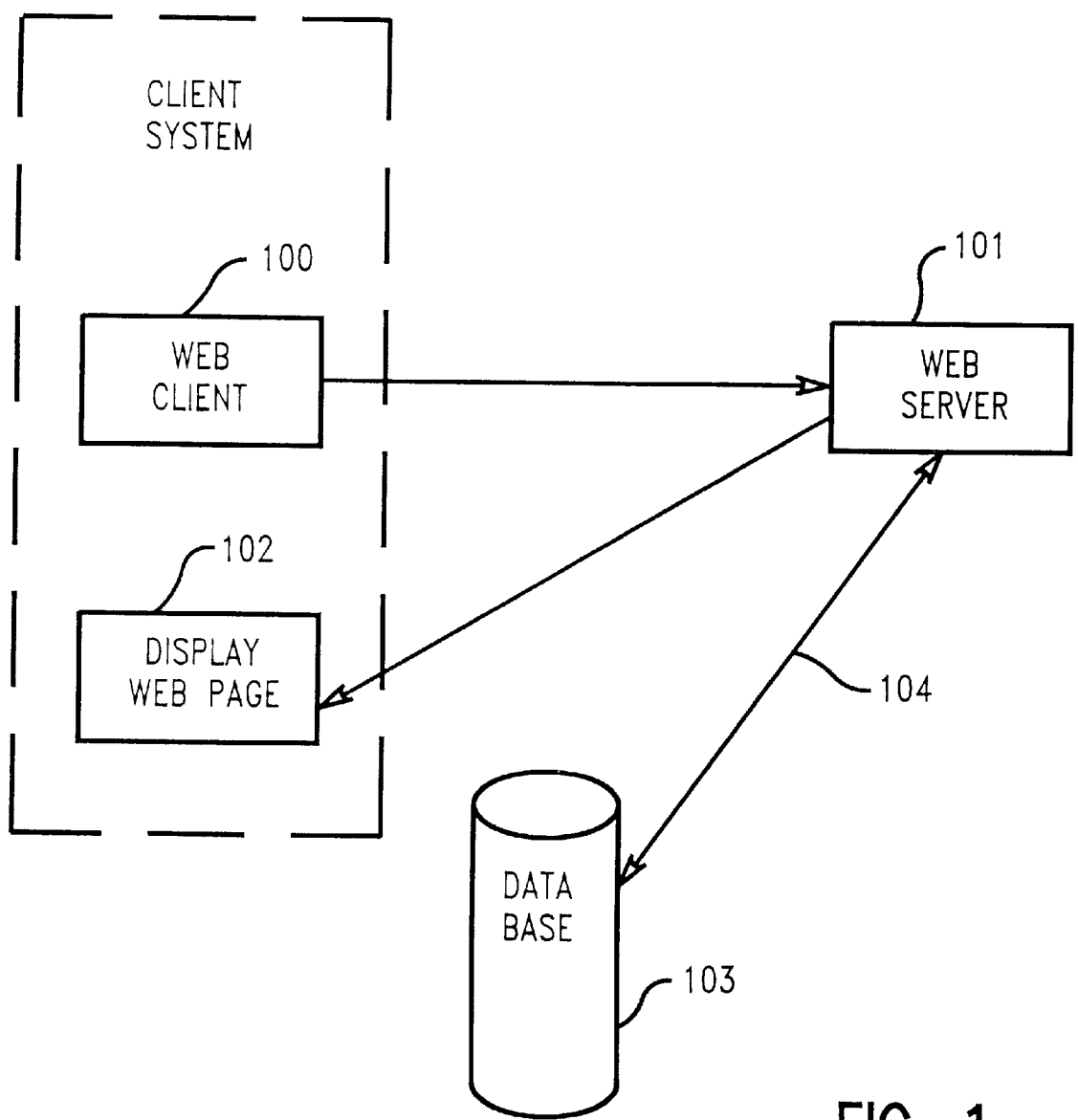
FIG. 1 is a schematic of the prior art system of accessing a desired file in a data base through a web server.
Figure 2:
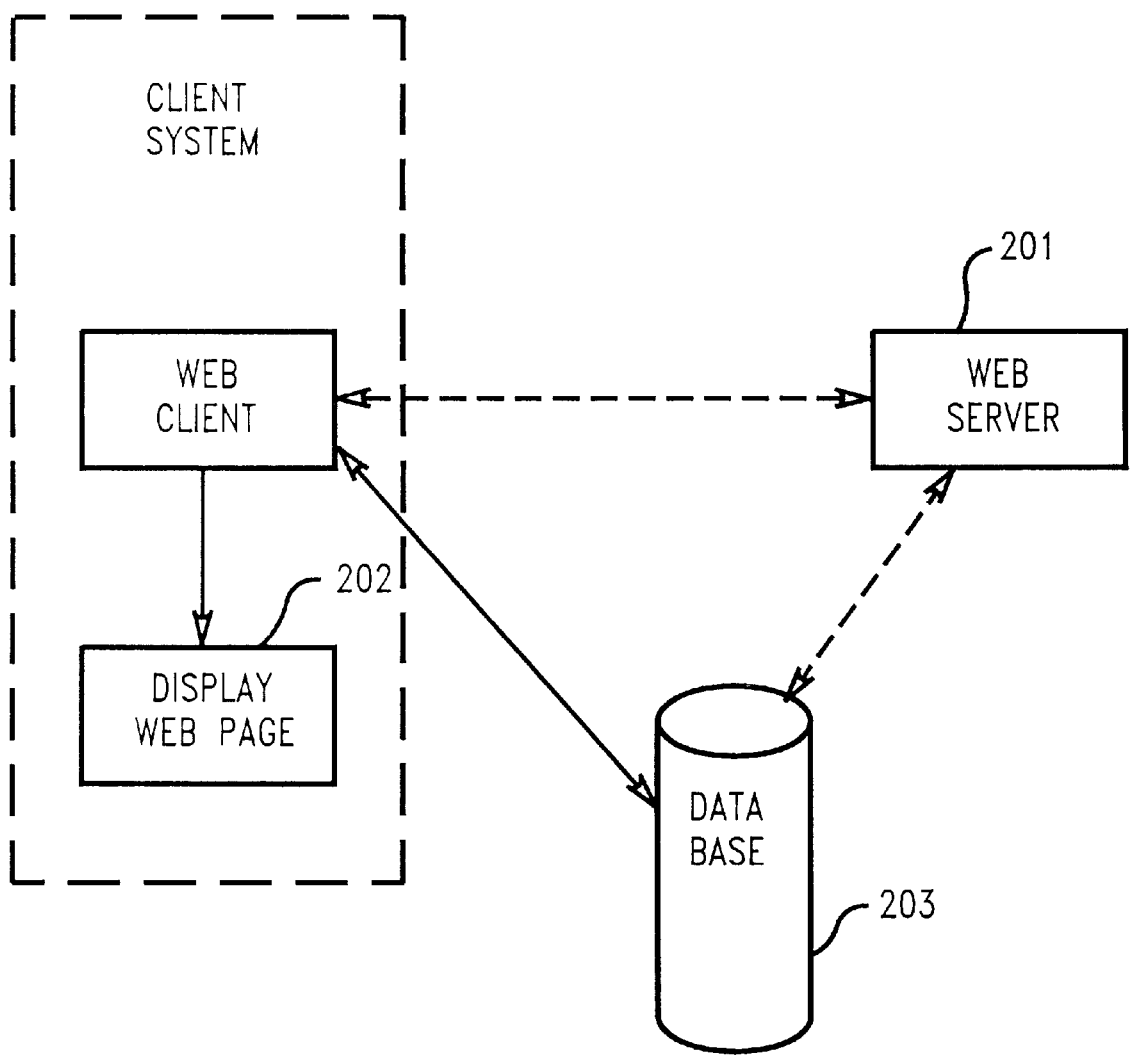
FIG. 2 is a schematic of the method and system of the present invention for accessing a desired file in a data base directly, without going through a web server.

In describing the preferred embodiment of the present invention, reference will be made herein to FIGS. 2 and 3 of the drawings in which like numerals refer to like features of the invention. Features of the invention are not necessarily shown to scale in the drawings.

The present invention provides a way for the web client user to attach the file system of a URL so that the user need not go through a web server when it is not necessary to do so. A URL (Uniform Resource Locator) is the address or location of a file on the web being utilized.

Additional definitions relevant to the present invention are as follows:

HTTP—Internet client/server protocol designed for the delivery of hypertext materials.

FILE URL—Represents access of files from computers on a network.

URL—Is a text string that indicates the server protocol to use in accessing the resource, the internet domain name of the server, and the name and location of the resource on that particular server.

Mount—Program for making the file system available to the web client.

The solution afforded by the present invention is a new URL of FSA (file system attachment) on the web browser. This new URL combines features of the URLs of HTTP and file. The new URL first attempts to attach the file system where the data is stored. Then the data can be processed like the current URL of file and not require the use of the server. This solution would be most useful for intranet applications.

If the client has access to the data base or the data storage where the requested information is stored, then the web server may be bypassed by having the URL of FSA act like the URL of "file". For example, in FIG. 2, a web client computer 200 first determines if the client has access to the desired data base 203 by a file system attachment (FSA), discussed further below. This FSA URL may be resident in the memory of client computer, entered by the user to the computer, or obtained by contact with a web server computer 201 which normally controls access to the data base 203, on a separate system. The FSA URL allows the web client to access the data to be displayed as a web page on screen 202 by having the web client, through the web browser resident on the client system, obtain the desired web page or other information directly from the data base of storage area 203. In order for this FSA URL to be effective, the user must know that the web client has access to the storage area.

The present invention includes information in the FSA URL as to the name of the file system, its location and the means to attach the file system.

An example of a URL of FSA is shown below in Table 1:

TABLE 1

<A HREF="fsa://ilc.fishkill.ibm.com"<fsa>/afs/fishkill.ibm.com/;ilcr, mount.exe</fsa>>Packaging</A>.East fishkill Packaging Organization After the term "HREF", appears the term "fsa". This designates the file system attachment URL. The start of the "fas" information follows <fsa>. "afs/fishkill/ibm.com/" is the file system name. "ilcr" is the machine identification that is used to access the file system. "mount.exe" is the name of the program that is used to access this particular file system. This program is resident on the web client and is executed on the web client. The program "mount.exe" is representative of many well known and widely available for making the file system available to the web client.

If the file system cannot be attached for any reason, such as the requester does not have the authority to access the file system or the client software to access the file system, then the new URL of FSA will act like the standard URL of HTTP. An unsuccessful attempt to attach the file system will make the client system aware not to make additional attachment attempts for subsequent calls to the file system. Instead, the client system will immediately behave like the URL of HTTP.

In the event the file system is attached, subsequent requests by the client system using the FSA URL will not re-attach the file system since the system will know that the file system has already been attached.

Figure 3:
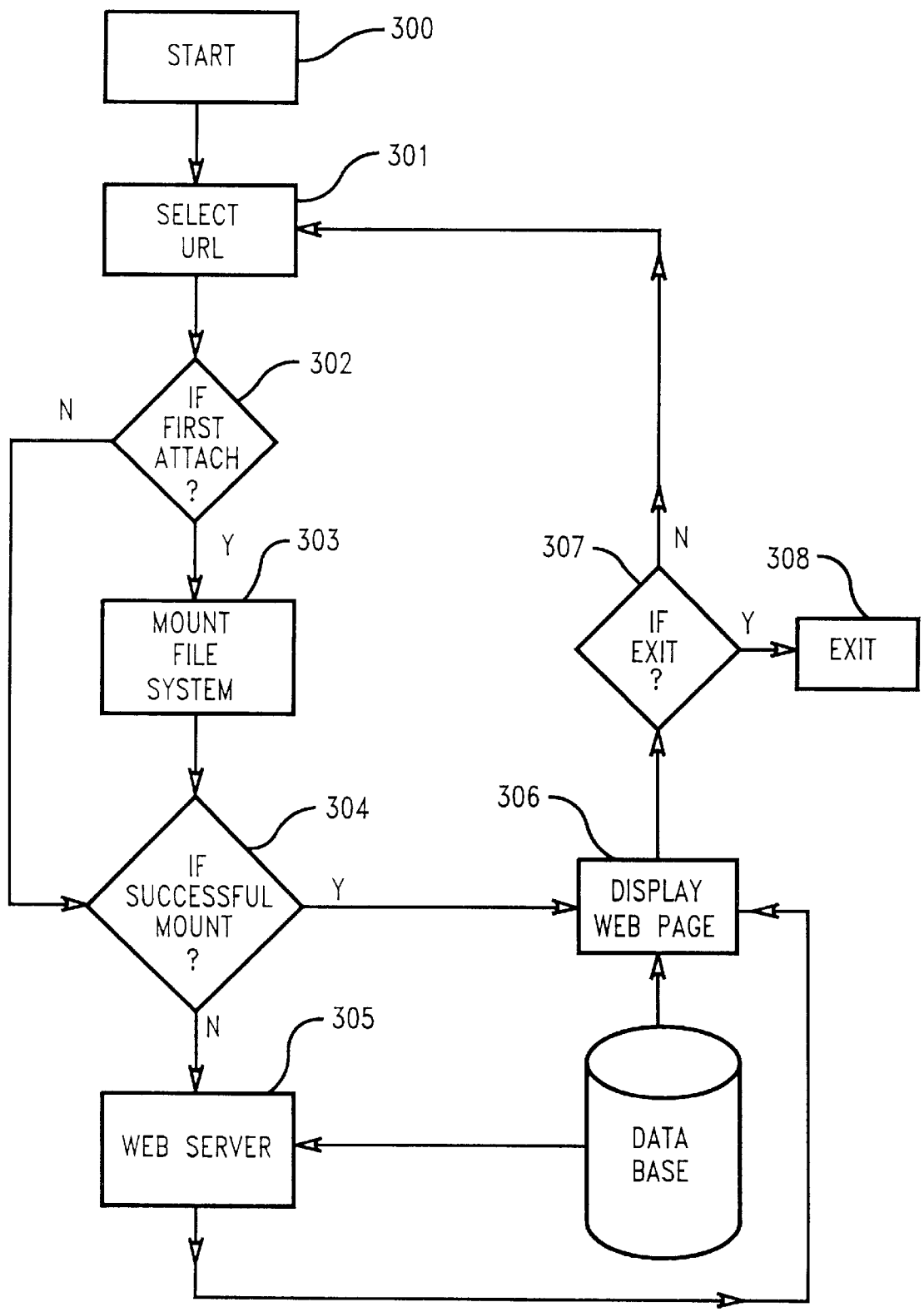
FIG. 3 is block diagram flow chart of the preferred steps employed in practicing the present invention.

A flow chart of the process used in the present invention is shown in FIG. 3. Numerals in circles indicate connections to like numerals in other parts of the flow charts. The flow chart description is as follows:

300 Start

301 Select the URL. Select the name of the information to be accessed.

302 If first attachment? Is this the first time a request has been made to attach the file system?

303 Mount the file system. Make the file system accessible to the web client.

304 If successful mount: Has the mount of the file system been successful?

305 Web server. If the mount of the file system has not been successful then the URL of FSA now acts as a URL of HTTP. The web client sends a transaction to the web server to access the data base to get the requested web page and then the web server sends the web page back to the client to be interpreted and displayed.

306 Display the web page. The client interprets the web page and displays the web page.

307 If exit? Does the user want to exit?

308 Exit the system.

The computer program or software incorporating the aforementioned steps and instructions may be stored on an otherwise conventional program storage device, such as a semiconductor chip, a read-only memory, or magnetic media such as a diskette or computer hard drive, which is readable and executable by a computer in conjunction with a web browser such as Netscape Navigator. The aforementioned program may be run on a computer in the background while running the web browser. The resulting direct access link between the client computer system and the desired data file on the network computer separate, from the web server, permits the client computer to access the information as if it were on the client computer's disk drive.

Accordingly, the present invention provides an improved method for directly accessing information on a file system accessible by a web server without accessing the web server, while determining whether the user has authority to access directly the desired file system. The invention also provides a method of accessing the desired file system if direct access is unsuccessful.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for accessing information on a computer with an inter- or intra-net web browser from a file system accessible by a web server comprising the steps of:
   a) providing, on a client computer system, access to a program for making available said desired file system;
   b) providing in a URL a file system attachment comprising a name of said desired file system, location of said desired file system, and identification of said program for making available said desired file system; and
   c) attaching said desired file system by directly contacting a data base containing said desired file system, utilizing said program and said name and location of said desired file system, without accessing said web server.

2. The process of claim 1 wherein steps (a) and (c) are processed on said client computer system separate from said web server.

3. The process of claim 1 further including providing in said file system attachment a user identification, and utilizing said user identification to access said desired file system.

4. The process of claim 1 further including in step (c) the step of determining if said client computer system has previously requested attachment to said desired file system.

5. The process of claim 1 wherein in step (b) the URL is provided in a web page accessed through a web server.

6. A program storage device readable by a machine, tangibly embodying a program of instructions executable by the machine to perform the process of claim 1.

7. A process for accessing information on a computer with an inter- or intra-net web browser from a file system accessible by a web server comprising the steps of:
   a) providing, on a client computer system, access to a program for making available said desired file system;
   b) providing in a URL a file system attachment comprising a name of said desired file system, location of said desired file system, and identification of said program for making available said desired file system;
   c) determining if said client computer system is attached to said desired system;
   d) if said client computer system is not attached to said desired system, attempting to attach said desired file system by directly contacting a data base containing said desired file system without accessing said web server;
   e) if said attempt to attach said desired file system in step (d) is successful, utilizing said program and said name and location of said desired file system to obtain information from said desired file system without accessing said web server; and
   f) if said attempt to attach said desired file system in step (d) is unsuccessful, obtaining information from said desired file system by utilizing said URL to send a transaction to said web server, attaching said desired file system with said web server; and returning said information to said client computer system with said web server.

8. The process of claim 7 wherein in step (b) the URL is provided in a web page accessed through a web server.

9. A program storage device readable by a machine, tangibly embodying a program of instructions executable by the machine to perform the process of claim 6.

10. A process for accessing information on a computer with an inter- or intra-net web browser from a file system accessible by a web server comprising the steps of:
   a) providing, on a client computer system, access to a program for making available said desired file system;
   b) providing in a URL a file system attachment comprising a name of said desired file system, location of said desired file system, and identification of said program for making available said desired file system;
   c) attempting to attach said desired file system by directly contacting a data base containing said desired file system without accessing said web server;
   d) if said attempt to attach said desired file system in step (c) is successful, utilizing said program and said name and location of said desired file system to obtain information from said desired file system without accessing said web server; and
   e) if said attempt to attach said desired file system in step (c) is unsuccessful, obtaining information from said desired file system by utilizing said URL to send a transaction to said web server, attaching said desired file system with said web server; and returning said information to said client computer system with said web server.

11. The process of claim 10 further including, prior to step (c), the step of determining if said client computer system is attached to said desired system, and if said client computer system is not attached to said desired system, attempting to attach said desired file system as in step (c).

12. The process of claim 10 wherein in step (b) the URL is provided in a web page accessed through a web server.

13. A program storage device readable by a machine, tangibly embodying a program of instructions executable by the machine to perform the process of claim 8.

14. A system for providing access to information on a computer with an inter- or intra-net web browser from a file system accessible by a web server, said system comprising:

a program for making available said desired file system; and a file system attachment in a URL comprising a name of said desired file system, location of said desired file system, and identification of said program for making available said desired file system;

whereby a data base containing said desired file system may be directly contacted utilizing said program and said name and location of said desired file system to attach said desired file system, without accessing said web server.

15. The system of claim 14 wherein said program is resident on said client computer system separate from said web server.

16. The system of claim 14 further including a user identification in said file system attachment, said user identification being adapted to control access to said desired file system.

17. The system of claim 14 wherein said the URL is provided in a web page accessible through a web server.

18. A system for providing access to information on a computer with an inter- or intra-net web browser from a file system accessible by a web server, said system comprising:

a program for making available said desired file system;

a file system attachment in a URL comprising a name of said desired file system, location of said desired file system, and identification of said program for making available said desired file system;

whereby a data base containing said desired file system may be directly contacted utilizing said program and said name and location of said desired file system to attach said desired file system, without accessing said web server, and, if the attempt to attach said desired file system is unsuccessful, information from said desired file system may be obtained by attaching said desired file system with said web server.

19. The system of claim 18 wherein said the URL is provided in a web page accessible through a web server.

* * * * *